April 14, 1970 A. S. GILIO ET AL 3,506,005

PRESSURE INFUSION DEVICE FOR MEDICAL USE

Filed Feb. 23, 1967 4 Sheets-Sheet 1

ARTHUR S. GILIO
NORMAN GORTZ
MICHAEL B. MACCARONE
INVENTORS.

BY FOWLER, KNOBBE
& MARTENS
ATTORNEYS.

ARTHUR S. GILIO
NORMAN GORTZ
MICHAEL B. MACCARONE
INVENTORS.

BY
FOWLER, KNOBBE
& MARTENS
ATTORNEYS.

April 14, 1970  A. S. GILIO ETAL  3,506,005
PRESSURE INFUSION DEVICE FOR MEDICAL USE
Filed Feb. 23, 1967  4 Sheets-Sheet 3

ARTHUR S. GILIO
NORMAN GORTZ
MICHAEL B. MACCARONE
INVENTORS.

BY FOWLER, KNOBBE
& MARTENS.
ATTORNEYS.

United States Patent Office 3,506,005
Patented Apr. 14, 1970

3,506,005
PRESSURE INFUSION DEVICE FOR
MEDICAL USE
Arthur S. Gilio, 10262 Deerhill, and Norman Gortz,
11151 Coventry Place, both of Santa Ana, Calif.
92705, and Michael B. Maccarone, 17932 Gillman
Ave., Irvine, Calif. 92664
Filed Feb. 23, 1967, Ser. No. 618,038
Int. Cl. A61m 5/14; B65d 37/00
U.S. Cl. 128—214
24 Claims

ABSTRACT OF THE DISCLOSURE

A container for supplying fluid under pressure includes a resilient bladder which is flexible between a contracted position in which there is no fluid in the bladder and an expanded position in which the bladder is full of fluid. The bladder is pre-tensioned, i.e., held in tension in the contracted position, so that the fluid will be dispensed at a pressure above a preselected minimum until the bladder is empty.

BACKGROUND OF THE INVENTION

This invention relates to pressurized fluid containers or the like, and more particularly, relates to fluid dispensing device in which the pressure for dispensing the fluid is provided by contraction of an expanded resilient membrane or bladder.

Compressed gas has long been used to force fluid from a container or vessel. For example, in a commonly used aerosol container compressed carbon-dioxide is mixed with the fluid and provides the pressure for dispensing it in response to operation of a manually controlled push-button. While aerosol pressurizing systems are satisfactory for many uses, problems have been encountered with developing sufficient pressure to dispense thick fluids. Moreover, addition of the gas to the fluid cannot be tolerated in many instances, and a dangerous explosion can result if the aerosol container is punctured or subjected to extreme heat.

Attempts also have been made in the past to use a resilient membrane to force fluid out of a container. In a typical prior art system, the membrane assumes a relaxed contracted position when there is no fluid in the container. As fluid fills the container, the resilient membrane expands and builds up tension. When it is desired to dispense the fluid contents, the outlet of the container is opened and the tension in the stretched membrane forces the fluid out of the container.

Such prior art attempts at a membrane system have suffered, however, because the pressure at which the fluid is dispensed inherently decreases as the membrane contracts, and theoretically reached zero at the time the membrane returns to its relaxed state. As a practical matter fluid flow stops even before the membrane reaches its relaxed state, because the pressure exerted by the membrane becomes too small to overcome the pressure head of the fluid. The problems of the prior art membrane systems are particularly significant in applications where a fixed minimum pressure must be sustained to overcome a high back pressure.

SUMMARY OF THE INVENTION

This invention is designed to provide an inexpensive, self-contained, pressurization system which does not use compressed gas to provide the dispensing pressure and yet provides pressure above a preselected minimum level until all, or substantially all, of the fluid is dispensed. A pressurized container constructed in accordance with this invention includes a membrane or resilient bladder which is flexible from an expanded position to a contracted position which it assumes when empty of fluid, and pre-tensioning means for maintaining tension in the bladder walls in the contracted position.

Because the bladder is pre-tensioned, it exerts a positive pressure on the fluid until the bladder reaches the contracted position, the minimum dispensing pressure being established by the amount of pre-tension applied to the bladder. The container advantageously is designed so that there is no space for fluid in the bladder when the bladder is in the contracted position and the container will be substantially emptied of fluid. Moreover, the maximum fluid dispensing pressure can be controlled by proper selection of the bladder material and dimensions.

One example of an application where a container constructed in accordance with this invention is particularly advantageous is in administering blood transfusions to humans or feeding them intravenously. For use, the pressure of the fluid supply must be sufficient to overcome the back pressure of the veins or arteries being fed, and yet can not be so high as to be dangerous to the circulatory system. In the past, gravity feeding has generally been employed with the container supported on a frame a sufficient distance above the patient. It is readily apparent that a gravity fed device has serious disadvantages in field conditions such as in military combat, where a patient may be carried on a stretcher, and then transferred to a helicopter, an airplane and an ambulance before arriving at a hospital for treatment. With the pressurization system of this invention, the container can be fastened to the body of the patient and yet the pressure will be maintained within the desired limits until the container is empty, irrespective of the position of the patient.

In the exemplary embodiments illustrated herein, the container includes an outer casing disposed around the bladder to protect the bladder and limit its expansion. An elongate mandrel has one of its ends fixed to the casing opposite the outlet and extends toward the outlet terminating interior of the casing. The bladder is an elongate tube of stretchable material closed at one end and having an outlet at the other end. The bladder is smaller in diameter than the mandrel and is stretched over the mandrel with the closed end of the bladder on the free end of the mandrel and the main portion of the bladder stretched down over the mandrel and doubled back along it. In that position the bladder walls are pre-tensioned and are squeezed tight around the mandrel so that there is no space for fluid between the juxtaposed layers of the bladder.

The outlet of the bladder is connected to a gland member which extends through the casing and has a passage for dispensing the fluid. The interior end of the gland member closely conforms to the free end of the mandrel and the peripheral surface of the gland member is substantially continuous with the mandrel periphery surface. The bladder is contracted tightly around the gland member and the mandrel, and little or no void is left in the container for fluid when the bladder is in the initial position.

Fluid, either gas or liquid, which enters the bladder through the passage must be at a pressure sufficient to overcome the pre-tension of the bladder and expand it. As the bladder is filled, the casing wall limits its expansion to hold the desired quantity. The outlet of the full bladder is sealed until it is desired to empty the contents. Then a valve in the outlet passage is opened and the bladder contracts and forces the fluid out. The bladder continues to exert positive pressure until it returns to its initial pre-tensioned position around the mandrel and all the fluid is gone. Thus, because of the pre-tensioning, even the last drop of fluid exits at a pressure above a preselected minimum as established by the amount of pre-tension.

The bladder can be a synthetic rubber material and all the remaining parts can be fabricated of inexpensive vinyl so that the container can be a "throw away" item. Moreover, the container can be any size or shape as desired for the particular application.

These and other objects, features, and advantages of the invention will be apparent from the following detailed description.

DESCRIPTION OF THE PREFERRED EMBODIMENTS

Figure 1:
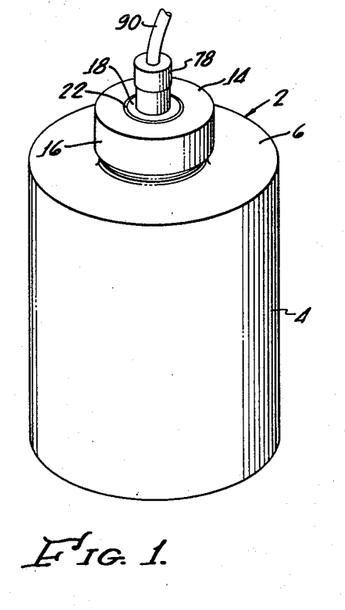
FIGURE 1 is a perspective view of an exemplary container embodying this invention.
Figures 2, 9:
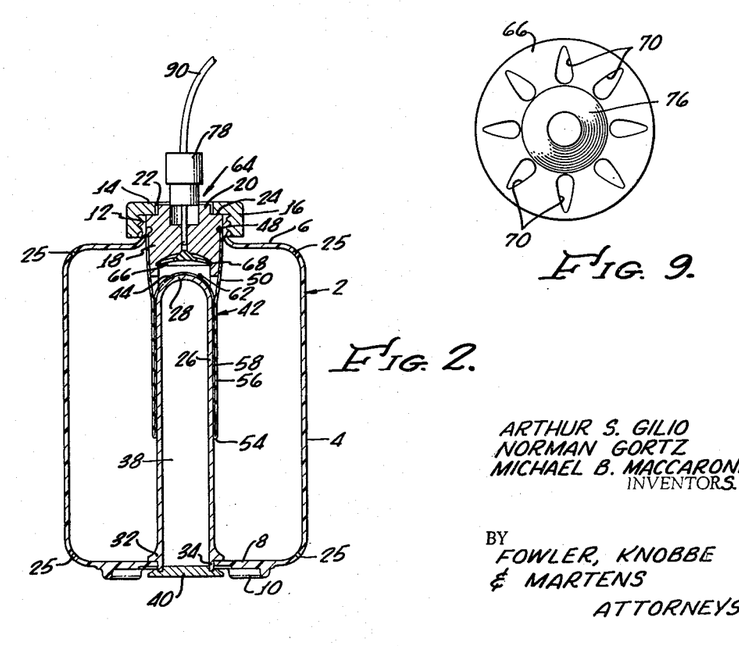
FIGURE 2 is a vertical diametrical section through the container of FIGURE 1 illustrating the bladder in the empty or contracted position.
FIGURE 9 is an enlarged plan view of the valve ring removed from the container.

Referring first to FIGS. 1 and 2, an exemplary container constructed in accordance with this invention includes a cylindrical outer shell or casing 2 having a sidewall 4, a top 6, and a bottom 8. Depending ribs 10 on the bottom of the container support it in the upright position. An externally threaded container neck 12 extends upwardly from the top wall 6 to define a circular opening through the casing. A cap 14 is fitted over the neck opening and is connected to the neck 12 by a depending threaded flange 16. A gland member 18 is force fit into the neck opening, and the upper end 20 of the gland member extends into a circular aperture 22 through the center of the cap. The portion of the cap 14 adjacent the aperture 22 bears down on an upwardly facing annular shoulder 24 on the gland member to hold the gland member in place. A plurality of small vent holes 25 extend through the casing near its top and bottom edges.

Figure 4:
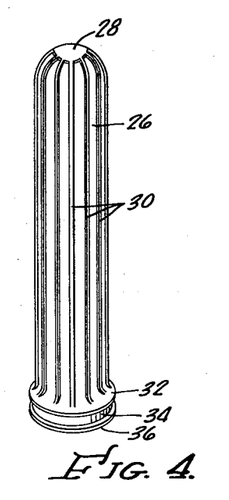
FIGURE 4 is a perspective view of the mandrel removed from the container.

An elongate cylindrical mandrel 26, shown in FIGS. 2 and 4, is disposed interior of the outer casing. The mandrel is hollow and is closed at the top 28 and open at the bottom. The exterior surface of the mandrel advantageously has a plurality of arcuately or circumferentially spaced ridges or flutes 30 extending all along its length. A downwardly facing annular shoulder 32 on the lower portion of the mandrel bears on the bottom wall 8 of the casing and is cemented or otherwise rigidly fixed thereto. A lip 34 extends downwardly from the shoulder portion 32 of the mandrel through an opening in the casing bottom wall and has an out-turned flange 36 at its terminal end. The storage space 38 interior of the hollow mandrel is closed by a removable cap 40 which snaps onto the depending lip 34, and can be readily snapped off with the fingers. The cap 40 is recessed above the supporting ridges 10 so as to protect it from accidental dislodgment.

Figure 3:
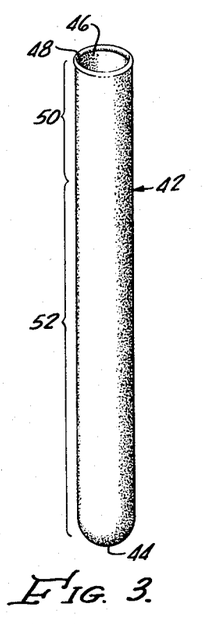
FIGURE 3 is a perspective view of the bladder removed from the container.

As is shown in FIG. 3, the exemplary bladder 42 is an elongate tube which is closed at one end 44 and has an outlet 46 at the other end with an internal sealing ring 48 formed around the periphery of its outlet. The bladder is constructed of a resilient material preferably of high lubricity having multi-directional elastic properties and shape memory characteristics. An example of a suitable material is a silicone rubber such as those presently available from General Electric Company (see Machine Design, Feb. 2, 1967, p. 73 and Space and Aeronautics, January 1967, p. 197) having tensile strengths up to 1500 p.s.i., tear resistance of approximately 250 lbs. per inch, elongation as high as 800%, and temperature capability, for example, from $-150°$ F. to $+450°$ F. These materials can be formed with a thin wall for the bladder. In the exemplary embodiment, the upper or neck portion 50 of the bladder is of the same diameter as the body portion 52 which extends from a short distance below the outlet to the bottom of the bladder. In any event, the body portion is smaller in diameter than the mandrel 26, and the neck portion 50 is smaller in diameter than the gland member 18.

Referring now to FIG. 2, the body portion of the bladder is stretched over the mandrel, the closed end 44 of the bladder being placed on the upper or free end 28 of the mandrel and the bladder being stretched radially to extend from there down along the mandrel to a position about midway along the mandrel and then doubled back at 54 to form an outer cylindrical bladder wall 56 tightly stretched around the inner cylindrical bladder wall 58. The outer wall continues upward with the neck 50 of the bladder stretched over the periphery of the gland member 18 and the sealing ring 48 inserted in a circumferential groove formed in the gland member adjacent the neck of the container 12. The sealing ring 48 and the tight fit between the neck of the bladder and the gland member provide an effective seal against fluid pressure. In the initial or empty position shown in FIG. 2, the bladder is stretched or pre-tensioned around the mandrel and the gland member because of the small diameter of the bladder in relation to the diameter of those parts, and the pre-tension in the body portion of the bladder is maintained by the mandrel and the pre-tension in the neck portion is maintained by the gland member.

Figures 5, 6, 7, 8:
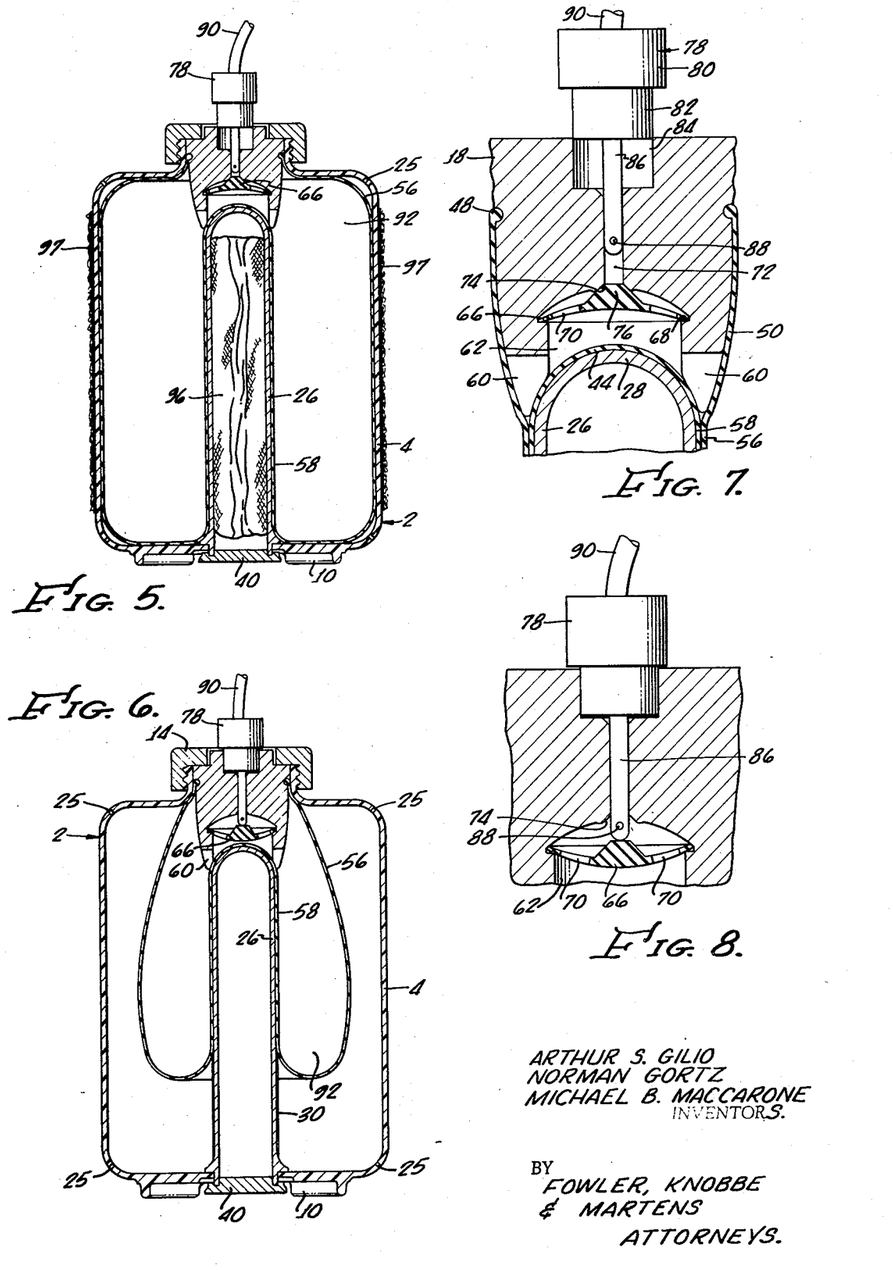
FIGURE 5 is a view similar to that of FIGURE 2 illustrating the bladder in the full or expanded position.
FIGURE 6 is a view similar to those of FIGURES 2 and 5 illustrating the bladder in an intermediate position.
FIGURE 7 is an enlarged vertical section through the exemplary valve of the container of FIGURE 1 illustrating the valve in the closed position.
FIGURE 8 is a view similar to that of FIGURE 7 illustrating the valve in the open position.

The outer periphery of the gland member is shaped so as to be more or less continuous with the outer periphery of the mandrel, and the lower end of the gland member terminates closely adjacent the inner wall member 58 of the mandrel and conforms closely to the shape of the mandrel free end 28 (see FIG. 7). Thus, substantially no void space is left interior of the bladder in the contracted position shown in FIG. 2. Radial grooves 60 formed in the lower surface of the gland member connect a central chamber 62 defined in the lower portion of the gland member with the interior of the bladder.

An exemplary valve 64 includes a cup-shaped resilient valve disc 66 supported on a shoulder 68 at the upper end of the gland chamber 62. As is shown in FIGS. 7-9, the valve disc 66 has a plurality of apertures 70 for the passage of fluid. A bore 72 through the gland member communicates with the gland chamber 62 and has a conical valve seat 74 formed at its lower end. A raised conical portion 76 at the center of the valve disc engages the valve seat to provide a fluid seal. A valve operating button 78 disposed above the container has an upper enlarged diameter portion 80 and a lower cylindrical portion 82 which is slidable into and out of a recessed area 84 in the upper part of the gland member. A tubular valve operating rod 86 extends downward from the button 78 into the bore 72 in sealing relationship, and has one or more side inlets 88 formed near its lower end. A flexible tubing member 90 in communication with thet passage in the operating rod 86 delivers fluid from the container.

The valve which is shown in the closed position in FIG. 7, is opened by pressing down on the pushbutton 78 so that the operating tube 86 pushes the valve disc 66 away from the valve seat 74 as shown in FIG. 8. Thus, the inlets 88 at the lower end of the operating tube 86 are in communication with the gland chamber 62 through the apertures 70 in the valve disc. The valve disc illustrated is of the over-centering type which may be partially opened, in which event it will automatically close upon release of the button, but if opened all the way to the position of FIG. 8, the valve will remain open even when the button 78 is released. The pushbutton 78 may have a safety device (not shown) which cooperates with the gland member 18 to prevent inadvertent opening of the valve either part way or all the way.

The operation of the container will be described with particular reference to FIGS. 2, 5 and 6. The container is shown in its empty state in FIG. 2. In order to fill the container it is necessary to unseat the valve disc 66. This may be done by pressing the pushbutton 78 only part way down so that the valve does not go over over-center and lock in the open position. Fluid is then forced into the container, for example, through the flexible tubing 90. Since the bladder walls are pre-tensioned, they will not permit fluid to enter unless it is of sufficient pressure to overcome their initial tension. That is, the pressure required to expand the bladder outer wall 56 will be geater because of the pre-tension in the wall. The required pressure will increase with an increase in the amount of the pre-tensioning.

With fluid supplied to the container at sufficient pressure, the fluid expands the bladder as is shown in FIG. 6, so that the bladder forms a fluid container or chamber 92 between the inner cylindrical bladder wall 58 and the outer cylindrical bladder wall 56. Initial entry of the fluid is assisted by the ribs 30 in the mandrel which tend to channel the fluid down along the mandrel. As the bladder expands, the air between the bladder and the casing 2 escapes through the vents 25. This filling operation can be continued until the bladder has expanded to the full position, which may, for example, occupy the entire interior of the outer casing 2 as is shown in FIG. 5, or may in some instances occupy only a portion of the casing such as shown in FIG. 6. In any event, when the desired quantity of fluid is contained in the bladder, the filling operation is stopped and the valve 66 is closed to seal the fluid in the container.

The container with the fluid in it may then be stored until such time as it is desired to use the contents. The pushbutton 78 is then forced downward to open the valve disc 66 to the position shown in FIG. 8. The fluid in the container is then again in communication with the flexible tubing 90 through the radial grooves 60 in the lower end of the gland member, the small chamber 62 in the gland member, the apertures 70 in the valve disc, the inlets 88 in the operating tube, and the central passage of the operating tube 86. The stress in the expanded walls of the resilient bladder applies pressure to the fluid in the container as the bladder tends to contract and forces the fluid through the outlet under pressure. The bladder will continue to contract through the position illustrated in FIG. 6 continuously dispensing the fluid under pressure. As the bladder approaches the empty position illustrated in FIG. 2, its walls still have sufficient stress, because of the pre-tensioning, to exert a positive pressure force on the fluid.

Because of the pre-tensioning of the bladder walls, that is the tension in the bladder walls in the empty position illustrated in FIG. 2, all of the fluid included within the bladder will be dispensed under pressure as the bladder returns to the contracted position illustrated in FIG. 2. Only a very small amount of fluid will remain in the gland member 18 and in the flexible tubing 90 when the contraction in the bladder is complete, so that the container will be substantially empty.

In some instances irregularities in the quality of the bladder material may cause the upper portion of the bladder body to contract completely before the lower portion completes its contraction. However, the bladder is constructed of a material which has a sufficiently low coefficient of friction or high enough lubricity that the outer wall 56 of the bladder will not stick to the inner wall 58 and trap small amounts of fluid in the lower portions of the bladder. Complete emptying is further assisted by the longitudinal ridges 30 on the mandrel.

The outer casing 2 of the container may be made of an inexpensive flexible plastic. As discussed above, the bladder is preferably made of a material such as a silicone rubber, and the remaining parts of the container are preferably all constructed of a semi-rigid plastic material such as polyvinyl chloride. Such materials are all quite inexpensive and permit the container to be constructed quite economically.

The diameter of the bladder relative to the diameter of the mandrel and gland member, the thickness of the bladder, and the modulus of elasticity of the bladder all determine the amount of pre-tension which will be present in the walls of the bladder in the initial position. The pre-tension necessary to maintain the dispensing pressure above any preselected minimal level is calculated or determined experimentally, and the bladder material and dimensions are selected accordingly.

Of course, the fluid pressure will increase as the bladder expands to the full position because the tension in the walls will increase. The thickness of the bladder material and its modulus of elasticity determine the increment in tension in the bladder walls between the contracted position illustrated in FIG. 2 and the full position illustrated in FIG. 5. As the difference between the minimum and maximum pressure at which the fluid will be delivered is proportional to this increment in tension, the maximum pressure can also be controlled by appropriate selection of the bladder material and thickness.

As noted above, the point 54 at which the bladder doubles back is about midway along the length of the mandrel. This permits the bladder to contract upward as well as inward in dispensing the fluid. While the exact location of the point 54 may vary in accordance with the materials used an related factors for most installations it advantageously is at position between about forty percent and seventy-five percent of the distance from the casing top wall 6 to the casing bottom wall 8.

Figures 10, 11:
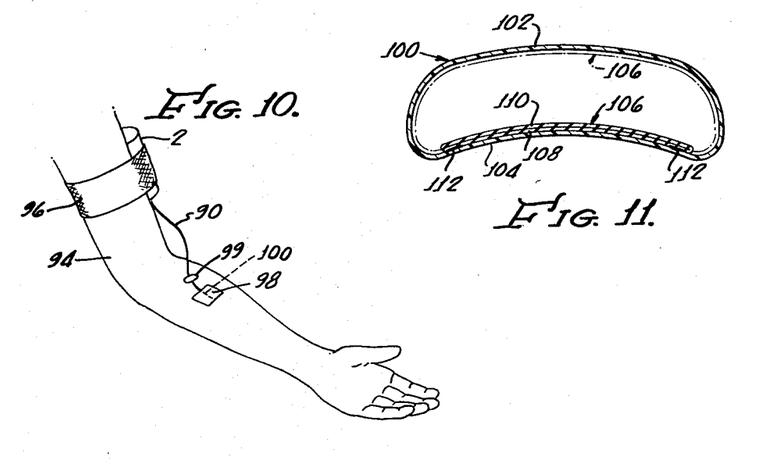
FIGURE 10 is an illustration of an exemplary use of the container illustrated in FIGURES 1-9.
FIGURE 11 is a horizontal section through a container illustrating a modified embodiment of this invention.

An exemplary application of the container 2 illustrated in FIGS. 1–9 is shown in FIG. 10. There the container is used for intravenous feeding and is fastened to the arm 94 of the patient with an elastic band 96 which may have, for example, "Velcro" fastening strips on its ends for fastening around the arm. It is sometimes preferred to fix one half of each of the "Velcro" strips 97 on the casing wall 4 to mate with opposite strips on the arm band (see FIG. 5). The flexible tubing 90 extends along the patient's arm and a needle 100 at the outlet end of the flexible tubing is inserted into the patient's vein and held in position by adhesive tape 98. A flow control device 99 in the tubing regulates or indicates the rate of flow of fluid to the patient. With the container so mounted, the patient can be moved easily without disturbing the intravenous feeding operation. The pressure of the fluid dispensed from the container will not be affected substantially by changes in the position of the patient.

The arm band 96, flow control 99, needle 100, and tape 98 can be stored in the mandrel storage compartment 38 as shown in FIG. 5, although in some instances it is preferred to leave the arm band wrapped around the outside of the container. The device is extremely simple to operate even by relatively unskilled personnel since the unit is entirely self-contained. The pre-tension built into the bladder and the characteristics and dimensions of the unit can be selected to inherently control the pressure within limits suitable for the human system. Because of the danger of too much pressure in medical use as described in relation to FIG. 10, the bladder is preferably of a material having a very low modulus of elasticity, so that a material of reasonable thickness can be used without a large incremental fluid pressure from the full to the empty position.

Figure 12:
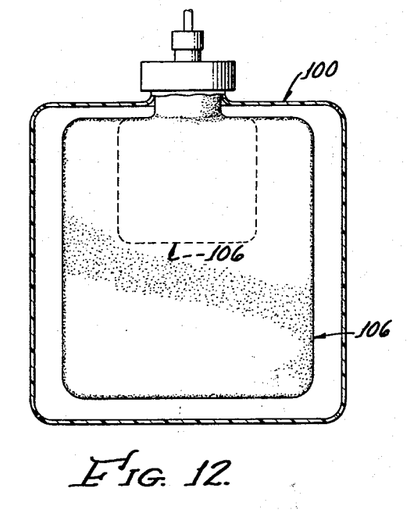
FIGURE 12 is an elevation view of the container illustrated in FIGURE 11, with one wall of the container outer casing removed for clarity.

Another embodiment of the invention is illustrated in FIGS. 11 and 12. In that embodiment, the outer casing 100 has a convex front wall 102 and a concave back wall 104 as shown most clearly in FIG. 11. Such a shape is, for example, particularly convenient for strapping against the arm of a patient. The gland and valve arrangement may be generally of the type illustrated in FIGS. 1–9, and will not be described in detail herein. The bladder 106 which is normally of the size and shape illustrated in dashed lines in FIG. 12, is pre-stretched with its opposite walls 108 and 110 tight against each other to the configuration illustrated in solid lines in FIGS. 11 and 12. The stretched bladder is bonded flat against the rear wall 104 of the outer casing along the edges of the bladder, for example at 112. In that position, one bladder wall 108 is tight against the rear wall 104 of the outer casing and the remainder of the bladder is pre-stressed and stretched flat against the bonded wall of the bladder. As fluid is forced into the bladder it must be of sufficient pressure to overcome the initial pre-stressing of the bladder walls. Fluid at sufficient pressure will enter the bladder and expand and unbonded wall 110 of the bladder until the bladder reaches the full position in which it may, for example, conform to the configuration of the casing as shown in dashed lines in FIG. 11.

Figure 13:
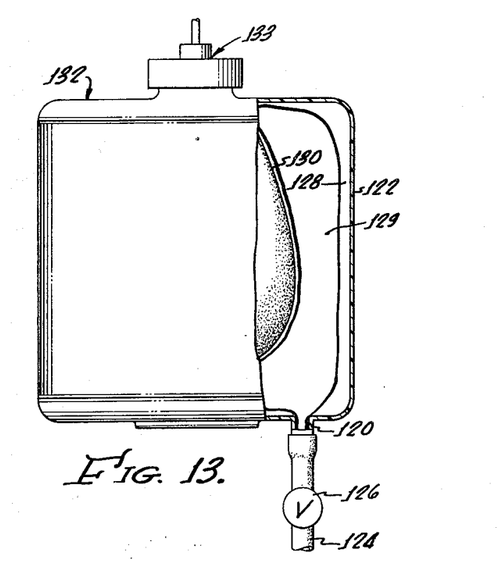
FIGURE 13 is an elevation view of the container illustrating another modified embodiment of this invention with a portion of the container side wall removed for clarity.

A further application of the pressurized container of this invention is illustrated in FIG. 13. In that embodiment, the vent holes are not included in the outer casing and are replaced by one vacuum inlet tube 120 extending out of the upper end of the casing wall 122. A flexible tubing 124 is connected to the vacuum tube 120 and a valve 126 is included on the tubing. A collapsible bag 129, for example of polyethylene, is sealingly connected to the vacuum tube 120 and is disposed in the sealed space 128 between the bladder 130 and the outer casing 132. As fluid is dispensed from the container through the outlet 133 with the valve 126 open, contraction of the bladder 130 draws a vacuum in the sealed space 128. That vacuum expands the collapsed bag 129 thereby pulling a vacuum in the bag 129 and through the flexible tubing 124. In this manner, the container is used as a push-pull device, i.e. as a vacuum device to pull fluid into the bag 129 while expelling fluid from the bladder 130. The vacuum mode may be used whether or not the fluid dispensed through the outlet is being utilized. For example, water could be dispensed from the bladder and disposed of while the bag is used to draw fluid from a selected source.

Figure 14:
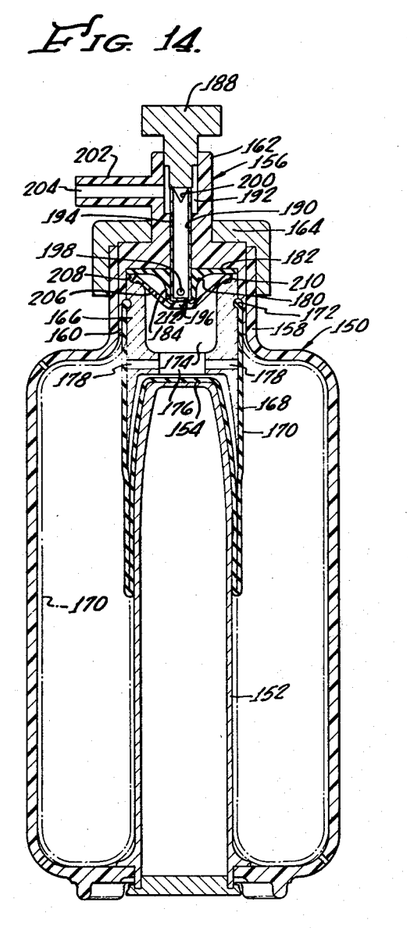
FIGURE 14 is a vertical diametrical section through a container, illustrating another modified embodiment of this invention.
Figure 15:
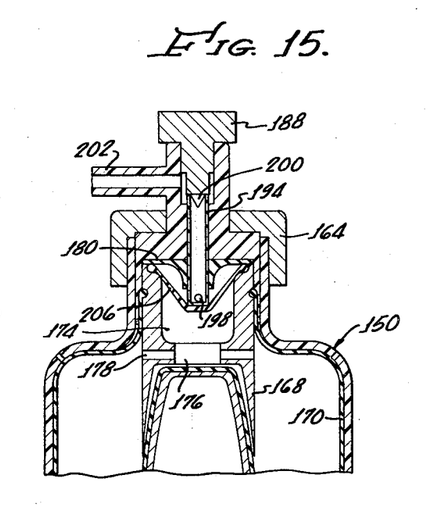
FIGURE 15 is a view similar to that of FIGURE 15 with the lower portion of the container cut away, illustrating the dispensing valve in the open position.
Figure 16:
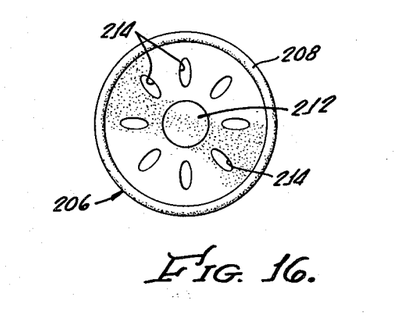
FIGURE 16 is a plan view of the resilient valve return disc removed from the container illustrated in FIGURE 14.

Still another modified embodiment of the invention is illustrated in FIGS. 14–16. This modified embodiment is adapted for dispensing viscous fluids, and especially food products such as ketchup, although it is not limited to such use.

The outer casing 150 and the mandrel 152 of this modified embodiment are generally similar to those described above with reference to FIGS. 1–9, except that the exemplary mandrel has a flattened closed or free end 154.

A dispensing member 156 is force-fit within the neck 158 of the casing and includes a lower tubular flange 160, and an upper extension 162 which protrudes through a central aperture in the cap 164. A gland member 166 is force-fit within the tubular flange 160 of the dispensing member and includes a tapered lower extension 168 which circumscribes the free end 154 of the mandrel. The bladder 170 has an annular sealing ring 172 around its outlet and the ring 172 is engaged in a peripheral groove in the gland member 166. The bladder extends from that groove along the peripheral surface of the gland member down around the mandrel and then doubles back up over the free end 154 of the mandrel. As in the embodiment discussed above, the bladder is smaller in diameter than the gland member and the mandrel and, therefore, is pre-tensioned or stretched around the gland member and the mandrel in the empty position illustrated in FIG. 14. A fluid chamber 174 in the gland member communicates with the interior of the bladder through a lower opening 176 and a plurality of radial ports 178.

A valve disc 180 is retained between the upper end of the gland member 166 and a downwardly facing surface 182 on the dispensing member. The valve disc has a thickened central portion 184 with a bore extending through it in alignment with a stepped diameter bore 190 through the dispensing member. The lower portion of a pushbutton 188 is slidably engaged in sealed relationship in the upper, large diameter portion 192 of the bore 190. A fluid conduit tube 194 extends downwardly from the pushbutton through the smaller diameter portion of the bore 190 and extends in sealing relationship into the bore of the valve disc 180. The tube 194 terminates in a closed end 196 interior of the valve disc bore in the position illustrated in FIG. 14 so that the plurality of side inlets 198 through the lower portion of the fluid conduit tube are sealed by the valve disc. The upper end of the fluid conduit tube 194 has two or more ports 200 communicating with the large diameter portion 192 of the stepped bore. A spout 202 extending outwardly from the upper portion of the dispensing member has a central outlet passage 204 in communication with the bore.

A resilient valve return disc 206, shown in FIG. 16 as well as in FIG. 14, is disposed immediately below the valve disc 180. The valve return disc has a peripheral support ring 208 which is tightly engaged between the valve disc and an upper shoulder 210 on the gland member. The return disc depends from that ring downward and inwardly to a flattened central portion 212 immediately below the central portion of the valve disc. A plurality of ports 214 through the inclined walls of the return disc permit the passage of fluid.

In FIG. 14 the valve arrangement is illustrated in the closed position. To open the valve the pushbutton 188 is pressed downwardly as illustrated in FIG. 15 so that the lower inlets 198 of the fluid conduit tube 194 extend below the valve disc 180 and are in communication with the fluid chamber 174 through the apertures 214 in the return disc 206. As the button 188 is pushed down the fluid conduit tube 194 stretches the resilient return disc 206, and when pressure is released from the pushbutton the return disc will return to the position of FIG. 10 raising the pushbutton and the fluid conduit tube to again seal the inlets 198 of the fluid conduit tube in the valve disc and cut off the flow of fluid.

In order to fill the container of this modified embodiment, the pushbutton 188 may be pressed down and fluid may be inserted under pressure, e.g., through the spout 202. As in the embodiments described above, the fluid must be under sufficiently high pressure to overcome the pre-tension in the walls of the bladder 170. As fluid is forced through the spout it passes through the spout passageway 204, into the enlarged diameter portion 192 of the stepped bore, through the ports 200, and the fluid conduit tube 194, out the inlets 198 at the lower end of the fluid conduit tube, through the apertures 214 in the valve return disc 206, into the fluid chamber 174 in the gland member, through the opening 176 and side ports 178, and into the bladder 170. The bladder continues to expand until the fluid supply is cut off by closing the valve or the bladder has reached the limit of its expansion and fills the outer casing member as shown in phantom in FIG. 14. With the bladder full, or partially full, the valve can be closed until it is desired to dispense the fluid. The fluid can be dispensed by again opening the valve using finger pressure on the pushbutton 188. With the valve open the tension in the bladder walls squeezes the fluid in the reverse direction from that of the filling operation and out the spout 202 until the desired amount is dispensed and the valve is again closed. As in the embodiments described above, the fluid contents in the bladder can be dispensed under pressure until the bladder has returned to its initial contracted position as illustrated in FIG. 14. Even with a relatively viscous fluid the amount of pre-tension in the bladder can be selected so as to completely dispense the fluid except for that small portion trapped in the passageways and the gland chamber when the bladder has returned to the contracted position.

While this invention has been described with reference to particular preferred embodiments, those embodiments are intended to be exemplary only, and the invention should be limited only in accordance with the following claims.

We claim:

1. In a pressurized apparatus for dispensing a fluid:
   a resilient bladder having wall means defining a fluid chamber interior of the bladder and a fluid outlet in communication with the interior of said bladder, the bladder being flexible from an expanded position which it assumes when empty of fluid; and
   additional surface means exterior of the bladder against which a substantial portion of the bladder wall means is stretched for maintaining tension in the bladder wall means in the contracted position so that said bladder is empty of fluid in the contracted position.

2. A pressurized apparatus in accordance with claim 1 and further comprising an outer casing disposed around the bladder and affixed thereto.

3. A pressurized apparatus in accordance with claim 2 wherein the means for maintaining tension in the bladder wall means in the contracted position includes:
   an elongate member exterior of the bladder having one end fixed to the casing and the other end interior of the casing, the bladder being disposed around the elongate member so as to contract tightly there around, and being of a size relative to the elongate member such that the elongate member prevents the bladder from contracting to its unstressed size, the difference in size and the elastic characteristics of the bladder being selected in accordance with the desired minimum pressure at which fluid is to be supplied from the container.

4. A pressurized apparatus in accordance with claim 3 wherein the bladder is an elongate tube of stretchable material having an outlet at one end and being closed at the other end, said bladder having a neck portion adjacent the outlet and a body portion of a diameter less than the diameter of the elongate member extending from the neck portion to the closed end;
   the elongate member is a mandrel fixed to the casing at the end opposite the casing outlet and extending toward the casing outlet; and
   the bladder in the contracted position is stretched over the mandrel with the closed end of the bladder on the free end of the mandrel and the body portion of the bladder stretched down over the mandrel and doubled back along the mandrel.

5. A pressurized apparatus in accordance with claim 4 wherein the bladder in the contracted position doubles back at a location less than about three-quarters of the distance from the casing wall adjacent the bladder outlet to the opposite end of the casing.

6. A pressurized apparatus in accordance with claim 3 wherein the elongate member is cylindrical and has arcuately spaced longitudinal ribs protruding from its periphery.

7. A pressurized apparatus in accordance with claim 3 wherein:
   the elongate member is tubular to provide storage space, the interior end of the elongate member being closed and the fixed end being open for access to the storage space.

8. A pressurized apparatus in accordance with claim 2 wherein:
   the means for maintaining tension in the bladder wall means in the contracted position comprises means fixing the stretched bladder to a wall of the outer casing.

9. A pressurized apparatus in accordance with claim 2 and further comprising:
   a sealed vacuum chamber defined between said bladder and said outer casing;
   an inlet through said casing in communication with said vacuum chamber.

10. A pressurized apparatus in accordance with claim 9 and further comprising a flexible bag disposed in said vacuum chamber and sealingly connected to said inlet for receiving fluids drawn through said inlet as the result of fluid within said bladder being discharged therefrom.

11. Apparatus for supplying fluid material under pressure comprising:
    a bladder having resilient wall means which are flexible from an expanded position in which a relatively large fluid chamber is defined interior of the bladder to a contracted position in which the fluid chamber is relatively small, the resilience of the wall means urging the bladder to the contracted position;
    an outlet formed in the bladder for the passage of fluid from the chamber; and
    surface means exterior of the bladder against which a substantial portion of the bladder wall means is stretched for prestressing substantially the entire bladder wall means and causing a substantial portion of the interior surface of the bladder wall to be in surface-to-surface engagement with another portion of the interior surface of the bladder wall in the contracted position; whereby when in the contracted position, the bladder is substantially empty of fluid.

12. A container in accordance with claim 11 wherein:
    gland means are connected in sealing relationship to the bladder outlet, said gland means having a passage therethrough for flow of fluid from the fluid chamber;
    the means prestressing the bladder wall means is an elongate mandrel exterior of the bladder fixed to the outer casing opposite the gland and extending interior of the casing toward the gland, said mandrel being approximately centered with respect to the bladder and terminating in a free end near the gland; and
    at least a portion of the bladder wall means are stretched around the mandrel in the contracted position.

13. A container in accordance with claim 12 wherein:
    the gland means extends through the outlet of the bladder and terminates in an end closely conforming to the free end of the mandrel; and
    the peripheral surface of the gland means is substantially continuous with the mandrel peripheral surface so that the bladder wall means contract tightly around the gland means and the mandrel.

14. A container in accordance with claim 13 wherein:
the gland means has a groove extending around its periphery; and
the bladder has a sealing ring defining its outlet and disposed in the groove of the gland means.

15. A container in accordance with claim 11 having a gland means comprising:
a body member affixed to the outer casing and extending therethrough;
a chamber interior of the body member;
a first port extending from the body chamber exterior of the outer casing;
at least one port in communication with the body chamber and the bladder fluid chamber; and
said first port being selectively sealed by the valve means.

16. A container comprising:
an outer casing having at least one air vent therethrough;
a resilient bladder disposed interior of the casing and having wall means defining a fluid chamber interior of the bladder, the bladder being flexible from an expanded position which it assumes when full of fluid to a contracted position which it assumes when empty of fluid;
a fluid outlet formed in the bladder;
gland means on the outer casing connected in sealing relationship to the bladder outlet, the gland means having a passage therethrough for flow of fluid from the fluid chamber;
valve means for selectively closing the passage to seal the fluid chamber; and
surface means exterior of the bladder against which a substantial portion of the bladder wall means is stretched for prestressing the bladder wall means and causing a substantial portion of the interior surface of the bladder wall to be in surface-to-surface engagement with another portion of the interior surface of the bladder wall in the contracted position; whereby when in the contracted position, the bladder is substantially empty of fluid.

17. Apparatus for forcing fluid into the circulatory system of a patient comprising:
a container including an outer casing;
a resilient bladder disposed interior of said casing and having wall means defining a fluid chamber interior of the bladder, the bladder being flexible from an expanded position which it assumes when full of fluid to a contracted position which it assumes when empty of fluid;
surface means exterior of the bladder against which a substantial portion of the bladder wall means is stretched for prestressing the bladder wall means and causing a substantial portion of the interior surface of the bladder wall to be in surface-to-surface engagement with another portion of the interior surface of the bladder wall in the contracted position; whereby when in the contracted position, the bladder is substantially empty of fluid.

18. Apparatus for forcing fluid into the circulatory system of a patient in accordance with claim 17 wherein said means maintaining tension in the bladder wall means defines a storage chamber for receiving portions of said apparatus when said apparatus is not in use.

19. Apparatus for dispensing viscous fluid such as ketchup comprising:
a container including an outer casing;
a resilient bladder disposed interior of said casing and having wall means defining a fluid chamber interior of the bladder, the bladder being flexible from an expanded position which it assumes when full of fluid to a contracted position which it assumes when empty of fluid;
surface means exterior of the bladder against which a substantial portion of the bladder wall means is stretched for prestressing the bladder wall means and causing a substantial portion of the interior surface of the bladder wall to be in surface-to-surface engagement with another portion of the interior surface of the bladder wall in the contracted position; whereby when in the contracted position, the bladder is substantially empty of fluid;
spout means on said outer casing providing an outlet from the container;
means defining a passage from the fluid chamber of the bladder to the spout means; and
valve means for selectively opening and closing said passage to dispense fluid from the bladder through the spout means.

20. Appartus for dispensing viscous fluid in accordance with claim 19 wherein:
said outer casing has means thereon for supporting it in an upright position;
said spout means is disposed above the bladder; and
said valve means is a normally closed pushbutton operated valve.

21. A pressurized container comprising:
an outer casing member forming a protective housing, said outer casing having a neck portion defining an opening therethrough at one end, a second opening extending through the casing at the opposite end, and a plurality of vent holes through the casing between said ends;
an elongate cyclindrical tubular mandrel having one end closed and the other end open, said mandrel being disposed interior of the casing with the open end of the manrdel in communication with the second opening in the casing and fixed to the casing and the closed end of the mandrel extending toward the neck of the casing;
removable means for closing the open end of the mandrel;
an elongate tubular bladder of resilient material having an outlet at one end and being closed at the other end, said bladder having an annular sealing ring around the periphery of its outlet, a neck portion adjacent to the outlet, and a body portion of a diameter less than the diameter of the mandrel extending from the neck portion to the closed end;
a gland member extending through the neck opening of the casing and affixed thereto, said gland member having a body portion defining an interior chamber, and a plurality of ports extending from the chamber radially outward to the periphery of the body portion, the lower end of the gland member being disposed closely adjacent to the closed end of the mandrel and shaped to conform thereto, and said gland member having a peripheral groove adjacent the neck of the outer casing;
said bladder in the contracted position being stretched over the mandrel with the closed end of the bladder on the free end of the mandrel and the body portion of the bladder stretched down over the mandrel and doubled back along the mandrel, and the neck portion of the bladder extending up over the gland member with the sealing ring engaged in the peripheral groove of the member; and
valve means for selectively opening and closing a passage from the galnd member to the exterior of the casing.

22. A pressurized container comprising:
an outer casing member having a neck portion defining an opening therethrough and a plurality of vent holes at spaced locations on the casing;
a gland member extending through the neck opening of the casing and affixed thereto, said gland member having a body portion defining an interior chamber, at least one port extending from the chamber to the periphery of the body portion and a passage extending from the chamber to the exterior of the casing;

a bladder of resilient material having an outlet disposed in sealed relationship with the gland member, the interior of the bladder being in communication with the interior chamber of the gland member through said port or ports of the gland member;

means affixing said bladder in a pre-tensioned relationship against one wall of the outer casing in the contracted position of the bladder; and valve means for selectively opening and closing said passage.

23. A pressurized container in accordance with claim 22 wherein, said outer casing member has a concave wall against which the bladder is stretched in the contracted position.

24. In a pressurized apparatus for dispensing a fluid:

a resilient bladder having wall means defining a fluid chamber interior of the bladder and a fluid outlet communicating with the interior of said bladder, the bladder having a predetermined spent configuration and assuming an expanded configuration when full of fluid;

an outer casing disposed around the bladder; and an elongate member exterior of the bladder having one end fixed to the casing and the other end interior of the casing, the bladder being disposed around the elongate member so as to contract tightly there- around and maintain tension in the bladder wall means in a contracted position, the bladder being of a size relative to the elongate member such that the elongate member prevents the bladder from contracting to its unstressed size so that said bladder assumes a configuration different than said spent configuration.

References Cited

UNITED STATES PATENTS

| 2,348,176 | 5/1944 | Gott et al. | 141—114 X |
| 2,816,690 | 12/1957 | Lari | 222—92 |
| 2,855,933 | 10/1958 | Erikson | 128—272 |
| 2,999,500 | 9/1961 | Schurer | 128—276 |
| 2,876,768 | 3/1959 | Schultz | 128—214 |
| 2,966,282 | 12/1960 | Geisler | 222—95 |
| 3,032,037 | 5/1962 | Huber | 128—276 |
| 3,048,171 | 8/1962 | Grau | 128—214.2 |
| 3,468,308 | 9/1969 | Bierman | 128—214 |
| 3,469,578 | 9/1969 | Bierman | 128—214 |

FOREIGN PATENTS 1,316,596  12/1962  France.

DALTON L. TRULUCK, Primary Examiner

U.S. Cl. X.R,

128—216; 222—215

PO-1050
(5/69)

UNITED STATES PATENT OFFICE
CERTIFICATE OF CORRECTION

Patent No. 3,506,005　　　　　　　　Dated April 14, 1970

Inventor(s) A. S. Gilio et al

It is certified that error appears in the above-identified patent and that said Letters Patent are hereby corrected as shown below:

Column 1, line 54, "reached" should read --reaches--.
Column 3, line 44, "Figure 15" second occurrence should read --Figure 14--. Column 9, line 37, after "when" insert --full of fluid to a contracted position which it assumes when--.
Column 12, line 64, "galnd" should read --gland--.

SIGNED AND SEALED
NOV 24 1970

(SEAL)
Attest:

Edward M. Fletcher, Jr.
Attesting Officer

WILLIAM E. SCHUYLER, JR.
Commissioner of Patents